US011194622B2

(12) United States Patent
Peter

(10) Patent No.: US 11,194,622 B2
(45) Date of Patent: Dec. 7, 2021

(54) SYSTEM AND METHOD FOR SCHEDULING A PLURALITY OF GUEST SYSTEMS AND/OR THREADS

(71) Applicant: OpenSynergy GmbH, Berlin (DE)

(72) Inventor: Michael Peter, Berlin (DE)

(73) Assignee: OPENSYNERGY GMBH, Berlin (DE)

( * ) Notice: Subject to any disclaimer, the term of this patent is extended or adjusted under 35 U.S.C. 154(b) by 129 days.

(21) Appl. No.: 16/468,288

(22) PCT Filed: Dec. 27, 2017

(86) PCT No.: PCT/EP2017/084640
§ 371 (c)(1),
(2) Date: Jun. 11, 2019

(87) PCT Pub. No.: WO2018/122260
PCT Pub. Date: Jul. 5, 2018

(65) Prior Publication Data
US 2020/0081737 A1 Mar. 12, 2020

(30) Foreign Application Priority Data
Dec. 27, 2016 (EP) .................................. 16207006

(51) Int. Cl.
*G06F 9/48* (2006.01)
*G06F 9/50* (2006.01)
(Continued)

(52) U.S. Cl.
CPC .......... *G06F 9/4881* (2013.01); *G06F 9/3836* (2013.01); *G06F 9/455* (2013.01);
(Continued)

(58) Field of Classification Search
CPC .. G06F 9/455; G06F 9/45533; G06F 9/45558; G06F 2009/45583; G06F 9/48;
(Continued)

(56) References Cited

U.S. PATENT DOCUMENTS 9,477,524 B2 * 10/2016 Kang ................... G06F 9/45558
2010/0153945 A1 * 6/2010 Bansal ................... G06F 9/4881
718/1

(Continued)

OTHER PUBLICATIONS

Feng et al, "A Model of Hierarchical Real-Time Virtual Resources", Proceedings of the 23rd IEEE Real-Time Systems Symposium (RTSS'02), 2002, IEEE, pp. 1-10 (Year: 2002).*

(Continued)

*Primary Examiner* — Charles M Swift
(74) *Attorney, Agent, or Firm* — Soquel Group LLC

(57) ABSTRACT

A method for scheduling guest systems and/or threads in a virtualization system that assigns processor time and memory space to guest systems and including a virtualization system scheduler, the method including running a first guest system that includes at least one first thread and at least one second thread running in the first guest system, and a guest system scheduler that assigns processing time to the at least one second thread, assigning a plurality of time reservations to the first guest system, wherein the plurality of time reservations include a first time reservation associated to one first thread and a second time reservation associated to the guest system scheduler of the first guest system, assigning processor time to the first guest system according to the second time reservation, and assigning processor time to the at least one first thread of the first guest system according to the first time reservation.

13 Claims, 2 Drawing Sheets

(51) Int. Cl.
*G06F 9/455* (2018.01)
*G06F 9/38* (2018.01)

(52) U.S. Cl.
CPC ............ *G06F 9/45558* (2013.01); *G06F 9/48* (2013.01); *G06F 9/485* (2013.01); *G06F 9/4806* (2013.01); *G06F 9/4818* (2013.01); *G06F 9/4843* (2013.01); *G06F 9/50* (2013.01); *G06F 9/5005* (2013.01); *G06F 9/5027* (2013.01); *G06F 9/5038* (2013.01); *G06F 9/5061* (2013.01); *G06F 9/5066* (2013.01); *G06F 9/5077* (2013.01); *G06F 2009/45583* (2013.01)

(58) Field of Classification Search
CPC .... G06F 9/4806; G06F 9/4818; G06F 9/4843; G06F 9/485; G06F 9/4881; G06F 9/50; G06F 9/5005; G06F 9/5027; G06F 9/5038; G06F 9/5061; G06F 9/5066; G06F 9/5077; G06F 9/3836
See application file for complete search history.

(56) References Cited

U.S. PATENT DOCUMENTS

| | | | |
|---|---|---|---|
| 2011/0225583 A1* | 9/2011 | Suh ...................... | G06F 9/4843 718/1 |
| 2012/0185848 A1* | 7/2012 | Devarakonda ........ | G06F 9/5077 718/1 |
| 2014/0282507 A1 | 9/2014 | Plondke et al. | |
| 2015/0178116 A1* | 6/2015 | Jorgensen ............ | G06F 9/5038 718/1 |

OTHER PUBLICATIONS

Burns, K. et al., "KairosVM: Deterministic Introspection for Real-time Virtual Machine Hierarchical Scheduling," Proceedings of the 2014 IEEE Emerging Technology and Factory Automation (ETFA), Sep. 16, 2014, pp. 1-8.
International Search Report for Application No. PCT/EP2017/084640, dated Mar. 27, 2018, 2 pp.

* cited by examiner

SYSTEM AND METHOD FOR SCHEDULING A PLURALITY OF GUEST SYSTEMS AND/OR THREADS

CROSS-REFERENCE TO RELATED APPLICATIONS

This application claims benefit under 35 USC § 371 of PCT Application No. PCT/EP2017/084640 entitled SYSTEM AND METHOD FOR SCHEDULING A PLURALITY OF GUEST SYSTEMS AND/OR THREADS, filed on Dec. 27, 2017 by inventor Michael Peter. PCT Application No. PCT/EP2017/084640 claims priority of European Patent Application No. 16 207 006.4, filed on Dec. 27, 2016.

FIELD OF THE INVENTION

The present invention concerns a method for scheduling a plurality of guest systems and/or threads in a system the system comprising a virtualization system running on a processor, the virtualization system being adapted to assign processor time and memory space to a plurality of guest systems and comprising a virtualization system scheduler.

Further, the present invention relates to a system comprising: at least one processor connected to at least one memory; a virtualization system adapted to run on the processor, the virtualization system being adapted to assign processor time and memory space to a plurality of guest systems and comprises a virtualization system scheduler; a first guest system adapted to run on the virtualization system, the first guest system comprising at least one first thread adapted to run in the first guest system, at least one second thread adapted to run in the first guest system, and a guest system scheduler adapted to assign processing time to the at least one second thread.

BACKGROUND OF THE INVENTION

Systems are known, which support several guest systems. Each operating system includes also a respective scheduler. Real time applications are only known to the scheduler of the respective scheduler of the operating system. The scheduling for a virtual machine is strictly hierarchical. Thus, the hypervisor allots a specific time to a virtual system and the scheduler of the virtual system allots a specific time to the respective thread of the virtual system. Under such an arrangement there are constellations (real-time tasks and their assignment to VMs) for which it is impossible to meet all scheduling objectives (often: deadlines) for all real-time applications even though a valid (global) schedule exists.

SUMMARY OF THE DESCRIPTION

Object of the invention is to provide a system and a method, which provides a more flexible scheduling.

According to an aspect a method for scheduling a plurality of guest systems and/or threads in a system, the system comprising a virtualization system running on a processor, the virtualization system being adapted to assign processor time and memory space to a plurality of guest systems and comprising a virtualization system scheduler, the method including:
running a first guest system on the virtualization system, the first guest system comprising at least one first thread and at least one second thread running in the first guest system, and a guest system scheduler adapted to assign processing time to the at least one second thread,
assigning, in the virtualization system, a plurality of time reservations to the first guest system of the first guest system, wherein the plurality of time reservations include a first time reservation associated to one first thread and a second time associated to the guest system scheduler of the first guest system,
assigning processor time, by the virtualization system scheduler, to the first guest system according to the second time reservation, and
assigning processor time, by the virtualization system scheduler, to the at least one first thread of the first guest system according to the first time reservation.

Further embodiments may include the following features in any feasible combination:
assigning processor time, by the virtualization system scheduler, to the at least one first thread according to the first time reservation includes: providing, by the virtualization system scheduler, information to the first guest system, the information enabling to determine that the first thread has to be dispatched; dispatching, by the virtualization system, the first guest system, and dispatching, by a dispatcher of the first guest system, the at least one first thread in the first guest system;
the first guest system includes a selector module, the method comprising: obtaining, by the selector module, the information from the virtualization system scheduler, determining from the information that the first thread is to be dispatched, and in response to determining from the information that the first thread is to be dispatched, dispatching the first thread;
assigning processor time, by the virtualization system scheduler, to the first guest system according to the second time reservation includes: providing, by the virtualization system scheduler, information to the first guest system, the information enabling to determine that a guest system scheduler has to determine the thread to be dispatched; dispatching the first guest system;
the method further comprises: obtaining, by the selector module, the information from the virtualization system scheduler, determining from the information that the guest system scheduler has to determine the thread to be dispatched, in response to determining from the information that the guest system scheduler has to determine the thread to be dispatched, assigning processor time, by the guest system scheduler of the first guest system, to the at least one second thread;
the method further comprises: running a second guest system and/or a third guest system on the virtualization system, the second guest system comprising at least one thread and/or the third guest system including a at least one thread running in the same processor privilege level as a scheduler and a dispatcher of the third guest system, assigning a fourth time reservation to the second guest system and or a fifths time reservation to the third guest system; and dispatching, depending on the fourth time reservation, the second guest system and/or dispatching, depending on the fourth time reservation, the third guest system;
the information is an identifier, in particular an integer, for example stored by the virtualization layer scheduler in a scheduling information shared memory;
the at least one first thread is a real-time thread;
the at least one second thread is a non-real time thread; and/or
a guest system, the information, a type of scheduling and/or a scheduling parameter is assigned to each time reservation, wherein in particular the type of scheduling is a real time scheduling or a fair share scheduling.

According to a further aspect, a computer program product is provided comprising commands for executing the method according an embodiment disclosed herein, when loaded and executed on a processor. According to an embodiment a computer program product may be a physical software product, for example a hard disc, a solid state disc, a CD-ROM, a DVD, comprising the program.

According to other aspects, the present invention relates to non-volatile memory, for example a hard disc, a solid state disc, a CD-ROM, a DVD, including a program containing commands for executing the method according an embodiment disclosed herein, when loaded and executed on a processor.

According to an aspect a system comprising:
at least one processor connected to at least one memory;
a virtualization system adapted to run on the processor, the virtualization system being adapted to assign processor time and memory space to a plurality of guest systems and comprises a virtualization system scheduler;
a first guest system adapted to run on the virtualization system, the first guest system comprising:
at least one first thread adapted to run in the first guest system,
at least one second thread adapted to run in the first guest system, and
a guest system scheduler adapted to assign processing time to the at least one second thread; wherein, in the virtualization system, plurality of time reservations are assigned to the first guest system, wherein the plurality of time reservations include a first time reservation for the at least one first thread and a second time reservation associated to the guest system scheduler of the first guest system, wherein the virtualization system scheduler is adapted to assign processor time to the first guest system according to the second time reservation, and to assign processor time to the at least one first thread of the first guest system according to the first time reservation.

Further embodiments may include the following features in any feasible combination:
assigning processor time, by the virtualization system scheduler, to the first guest system according to the second time reservation includes dispatching the first guest system; and/or
the first guest system includes a guest system scheduler, wherein the guest system scheduler is adapted to assign processor time to the at least one second thread.

Further advantages, features, aspects and details are evident from the dependent claims, the description and the drawings.

The present invention concerns in particular a mechanism whereby the execution of a viable taskset only depends on the existence of a viable schedule, not on the assignment of the tasks to guest systems.

BRIEF DESCRIPTION OF THE DRAWINGS

So that the manner in which the above recited features of the present invention can be understood in detail, a more particular description of the invention, briefly summarized above, may be read by reference to embodiments. The accompanying drawings relate to embodiments of the invention and are described in the following.

DETAILED DESCRIPTION

Figure 1:
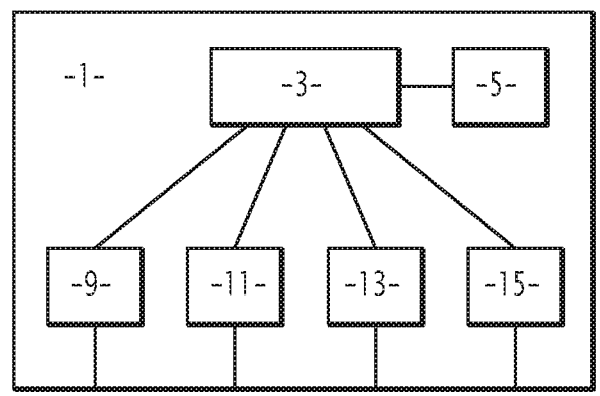
FIG. 1 shows schematically the hardware of an electronic control unit (ECU)
Figure 3:
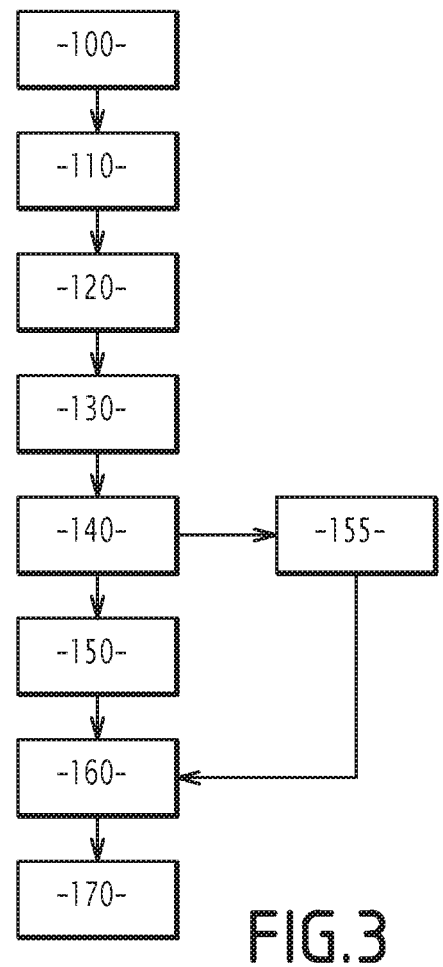
FIG. 3 shows a flow chart of a method according to an embodiment.

FIG. 1 shows schematically an electronic control unit (ECU) 1. The ECU 1 might be also called control unit in the present patent application. For example, the ECU 1 is realized as a system on chip (SoC). According to an embodiment, an ECU comprises one or more processors 3 connected to one or more memories 5. Further, the ECU 1 may comprise interface for connecting to one or more bus systems, for example one or more hardware controller 9 for controller area network (CAN) busses and/or one or more hardware controller 11 for FlexRay busses. The ECU may also comprise further hardware controller for connecting to one or more wired or wireless connecting means, for example a Bluetooth connection, an Ethernet connection and/or to a USB (Universal Serial Bus) connecting means.

Usually, an automotive vehicle comprises a plurality of electronic control units (ECU), which may be assigned to different units of the vehicle, for example the steering wheel, the brakes, the windows, the motor etc. For example, the ECU may be connected to some sensors or drivers via an interface 13, for example to drive the window, or to sense the angulation of the steering wheel, the level of oil or water in the motor. These ECUs may be connected to one or more displays via one or more display ports 15.

Further, to ECU may be connected to an input device, for example a keyboard, one or more buttons, or the like.

According to an embodiment, the ECU 1 is provided as an embedded system in a vehicle. The present invention may also relate to a standard computer.

Figure 2:
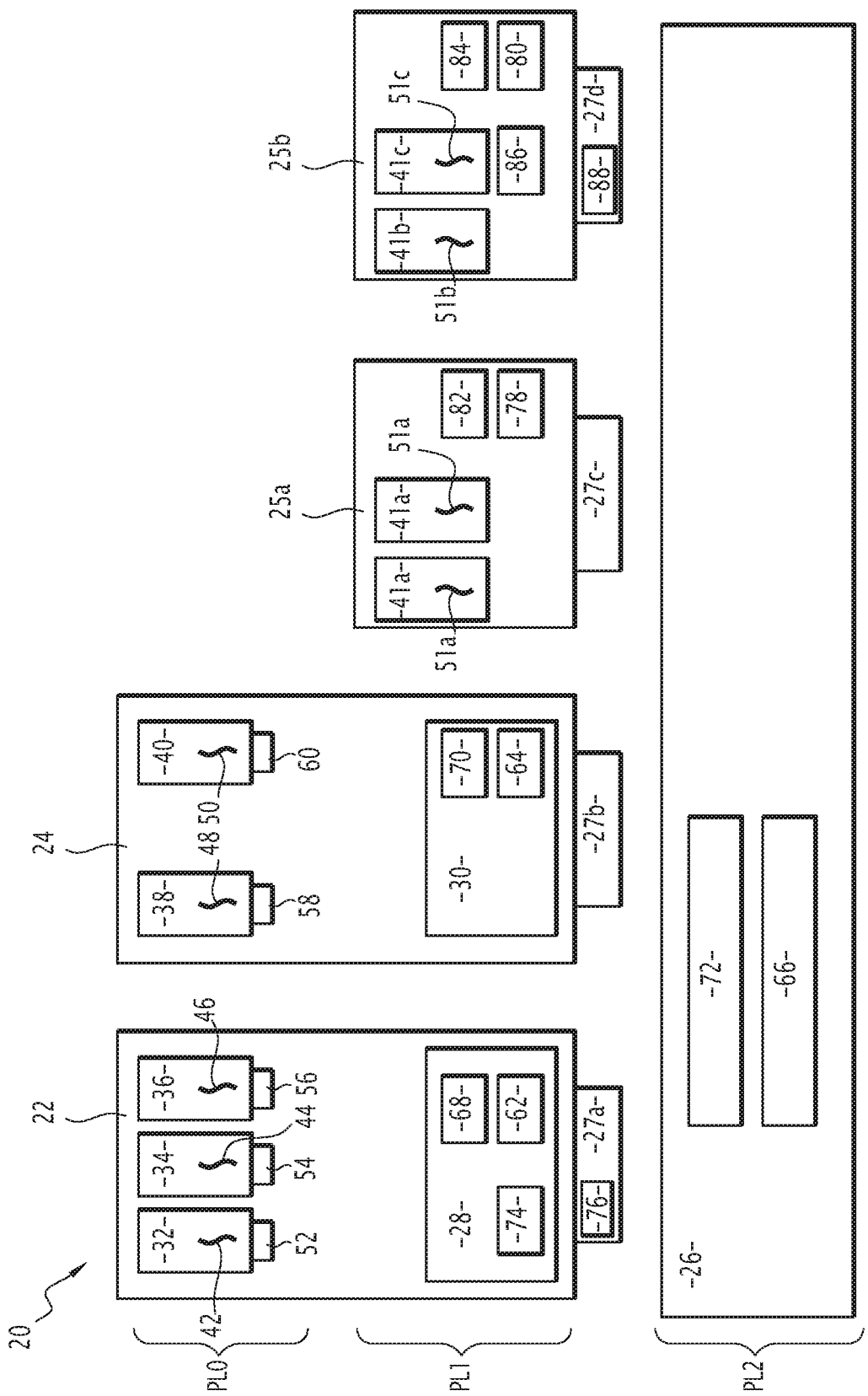
FIG. 2 shows schematically a system according to an embodiment of the invention.

FIG. 2 shows schematically a system 20 according to an embodiment of the invention. The system 20 includes a plurality of guest systems 22, 24, 25a, 25b. FIG. 2 shows only four guest systems, namely a first guest system 22, a second guest system 24, a third guest system 25a and a fourth guest system 25b. According to some embodiments, the system 20 may include one, two or even four or more guest systems 22, 24, 25a, 25b. Each guest system 22, 24, 25a, 25b may include an operating system.

Each guest system 22, 24, 25a, 25b which include, for example, guest operating systems, runs in a separate partition.

The guest systems 22, 24, 25a, 25b are running via a virtualization system 26, for example a hypervisor, on the microprocessor 3 of the ECU. In other words, the virtualization system 26 enables several operating systems of the guest systems 22, 24, 25a, 25b to run on the microprocessor 3.

One example of a virtualization system 26 is a hypervisor between the hardware, for example a system on chip (SoC), and the guest systems 22, 24, 25a, 25b. The hypervisor runs directly on the hardware, in particular a processor 3, to control the hardware and manages the guest systems. The hypervisor provides and defines a simulated hardware of guest systems installed. Further, the hypervisor assigns the hardware resources to the respective guest systems, as it will be explained later and mechanisms for communication between different guest systems or partitions (inter-partition-communication (IPC)).

The first and second guest systems 22, 24 operating systems include respectively an operating system kernel 28, 30. The third and fourths guest systems 25a, 25b only include a primitive kernel as it will be explained later.

Further a plurality of applications 32, 34, 36, 38, 40, 41a, 41b, 41c are running in the guest systems 22, 24, 25a, 25b. It should be noted that in each guest system 22, 24, 25a, 25b only two respectively three applications 32, 34, 36, 38, 40, 41a, 41b, 41c are shown. However, each guest system 22, 24, 25a, 25b might even include more applications 32, 34, 36, 38, 40, 41a, 41b, 41c.

Each application 32, 34, 36, 38, 40, 41a, 41b, 41c may include one or more threads 42, 44, 46, 48, 50, 51a, 51b, 51c. It should be noted that the same reference number regarding the application and thread does not mean that the respective applications or threads are identical. According to embodiments, each guest system guest system implements its own thread model. A thread model is a part of on operating system application program interface that relates to thread operations.

According to some embodiments, the at least one processor 3 includes a plurality of processor privilege levels. In FIG. 2 three processor privilege levels PL0, PL1, PL2 are shown. In other systems, these are called EL0, EL1, EL2, for example for an ARM64 processor of ARM Ltd. Each processor privilege level has specific rights to access the resources of the processor 3 or other hardware. This prevents the misuse of resources. According to an embodiment, the at least one processor 3 has three processor privilege levels PL0, PL1, PL2. In other embodiments, the processor 3 may also have more than three processor privilege levels, in particular only some of them being used.

According to an embodiment, for example as in an ARM v7 architecture, the level PL0 is the least privileged level, the second level PL1 is the medium privileged level and the PL2 is the most privileged, for example virtualization system, level.

In case of three processor privilege levels (three stage virtualization or 3-tier architecture), the virtualization system 26 has the highest processor privilege level, the operating systems kernels 28, 30 running in the partitions have the second processor privilege level, and the applications 32, 34, 36, 38, 40 running on the operating systems or in the guest systems in the partitions have the lowest processor privilege level. The highest processor privilege level, for example called PL2, allows the most extensive access to the resources of the processor 3.

In some embodiments, which may be combined with any other embodiments disclosed herein, the processor in the system provides two privilege levels. Then, the virtualization system 26 runs in the privileged mode (processor privilege level), whereas the guest system kernel(s) 28, 30 runs in a less privileged mode of the processor privilege levels. The guest applications 32 to 40 also run in the less privileged mode of the processor privilege levels. The guest system kernel(s) 28, 30 is then protected from the applications by the virtualization layer.

In some embodiments the third guest system 25a and the fourth guest system 25b or further guest systems may not use an address space protection between portions of an guest operating system and applications 41a, 41b, 41c. Such a system may be called lightweight virtual machine. For example, in the third and fourths guest systems 25a, 25b, an application 41a, 41b, 41c has the same processor privilege level as the operating systems in the first and second guest systems 22, 24, which is, in particular, suitable for a real time system.

In case of a 3-tier architecture a hardware or hardware assisted virtualization is used. In case of a hardware virtualization, the registers for storing the status of the guest system and/or the applications running on the guest system are hardware registers.

Further, according to some embodiments, an interface between the virtualization system 26 and the guest systems 22, 24, 25a, 25b is identical to that of the underlying hardware, here the at least one processor 3, which corresponds to a so called full virtualization. In a full virtualization a complete instruction set architecture of a processor is simulated by the virtualization system 26. In other words, the instruction set architecture 27a, 27b, 27c, 27d is the interface between the guest systems and the virtualization system 26.

According to an embodiment, the first guest system 22 may include one or more real time applications 32 and one or more non-real time applications 34, 36. In FIG. 2 only one real time application 32 is shown, however, the first guest system 22 may also include more than one real time application 32.

The real time applications 32 include one or more real time threads 42. Only one real time thread 42 is shown in FIG. 2.

A real time (operating) system, applications or thread enable the processing of data in real time. For example, a real time (operating) system, applications or threads have predefined or guaranteed response times. According to an embodiment, they may have predictable response times and behavior, in particular for the scheduling and the memory management.

A thread represents a sequence of instructions that can be independently managed by a scheduler. In other words a process may comprise one or more threads. Each thread 42, 44, 46, 48, 50, 51a, 51b, 51c is associated with respective user registers and, optionally with a specific time reservation. Usually, the guest system, in particular the guest operating system kernel, determines whether a time reservation is associated with a respective thread. The time reservation is defined by the scheduler of the virtualization system 26 as it will be explained later.

The applications 32, 34, 36, 38, 40 interact with the respective operating system kernels 28, 30 via respective application program interfaces 52, 54, 56, 58, 60.

The applications 41a, 41b 41c, include an application program interface, not shown in FIG. 2.

The operating system kernels 28, 30 and the virtualization system 26 include respectively a scheduler 62, 64, 66, 78, 80. Further, the guest systems, in particular the operating systems kernels 28, 30, and the virtualization system each comprise a dispatcher 68, 70, 72, 82 and 84.

The guest systems 25a, 25b include a time interrupt control. For example, in case a guest system 25a, 25b includes a single thread 51a, 51b, 51c, these guest systems do not include a scheduler. In more complex guest systems 25a, 25b, which handle more than one thread 51a, 51b, 51c, a scheduler 78, 80 and a dispatcher 82, 84 may be present. For example, FreeRTOS is an example of such a system.

First, the schedulers 62, 64, 78, 80 will be explained.

The scheduler 62, 64, 78, 80 knows the threads 42, 44, 46, 48, 50, 51a, 51b, 51c and schedules them according to their scheduling parameters. For example the scheduling parameters define whether a real time or a fair share scheduling is applied to the respective thread. According to an embodiment a real time scheduling, a cyclic scheduling or a static or dynamic priority scheduling is used. The scheduling parameter defines the actual values, for example the part of the fair share scheduling, the period in case of cyclic scheduling and the like.

Further, the dispatcher 68, 70, 82, 84 stores or instructs to store the user registers of the threads 42, 44, 46, 48, 50, 51a, 51b, 51c. The user registers may be also called general purpose registers or PL0 registers in some embodiments according to their processor privilege level. For example, the user registers of the threads 42, 44, 46, 48, 50, 51a, 51b, 51c include the state of the registers used by the respective thread 42, 44, 46, 48, 50, 51a, 51b, 51c. Thus, in case the dispatcher is instructed to stop the execution of a first thread 42, 44, 46, 48, 50, 51a, 51b, 51c, it stores or instructs to store the user registers (or state) of the first thread 42, 44, 46, 48, 50, 51a, 51b, 51c and loads or instructs to load the user registers of the next thread 42, 44, 46, 48, 50, 51a, 51b, 51c that should be executed on the processor.

The respective scheduler 62, 64, 78, 80 of the guest systems 22, 24, 25a, 25b defines scheduling of the threads 42, 44, 46, 48, 50, 51a, 51b, 51c in its respective guest system. For example, a scheduler of a guest system 22, 24, 25a, 25b knows the threads 42, 44, 46, 48, 50, 51a, 51b, 51c of its guest system 22, 24, 25a, 25b and their scheduling parameters. The scheduling parameters are maintained by the respective scheduler 62, 64, 78, 80. If the scheduler 62, 80 of guest systems 22, 25b is bypassed (that is, a selector module 74, 86 dispatches the thread directly without consulting the scheduler, as it will be explained here-below), the scheduling parameters become irrelevant.

Further, the operating system kernel 28 of the guest systems 22 includes a selector module 74 and the guest system 25b includes a selector module 86, which is adapted to determine, whether a thread, for example thread 42 in case of guest system 22 or thread 51c of guest system 25b, should be directly dispatched or whether the respective scheduler 62, 80 should decide which thread 42, 44, 46, 51b, 51c should be dispatched and informs the dispatcher 68, 84 accordingly to dispatch the thread 42, 51c. In case the selector module 74 has determined that thread 42 should be directly dispatched, it is adapted, in response thereto, to inform the dispatcher 68 thereabout, which subsequently dispatches the thread 42 directly. In other words, in case of a direct dispatch, the scheduler 62 is skipped or bypassed. The same applies for the guest system 25b including the selector module 86.

In other words, the dispatcher 68 of the guest system 22 is adapted to perform the context switches of a plurality of running threads or applications, for example to switch from a first thread 44 to a second thread 46. In an embodiment, the dispatcher 68 switches a context in response to an instruction from the scheduler 62 or the selector module 74. The same applies for the guest system 25b including the selector module 86 and the dispatcher 84.

The selector module 74 acts, according to some embodiments, in response to a scheduling notification, which is, for example, delivered as a virtual interrupt. The scheduler 62, 80 can also act in response to a (virtual) interrupt (in case the selector module 74 decided not to bypass it). However, the scheduler 62, 80 can also be invoked in reaction of a local thread operation (for example the current thread blocks) without invoking the hypervisor. The deactivation of a real-time thread (for example when its current job is finished) results in an hypercall so that the scheduler 66 of the virtualization system 26 can reevaluate the situation.

According to embodiments, the interface 27a between the first guest system 22 and the virtualization layer 26 includes a scheduling information shared memory 76. The scheduling information shared memory 76 is written by the virtualization layer 26 and read by the selector module 74. The scheduling information shared memory 76 is adapted to include information, whether the guest system 22, in particular the operating system kernel 28 should schedule the threads 42, 44, 46 according to the scheduler 62, or whether a thread, for example the thread 42, should be directly dispatched. In an embodiment, an integer value is stored in the scheduling information shared memory 76 to define whether a thread 42 should be directly dispatched or whether the scheduler 62 of the guest system 22 should be activated. In other embodiments, other channels may be used to inform the selector module 74, which thread should be directly dispatched or whether the scheduler should determine, which thread of the guest system 22 should be dispatched.

According to an embodiment, the selector module 74 is automatically activated after the guest system 22 was activated by the dispatcher 72 of the virtualization system 26. Further, in some embodiments, the virtualization layer 26 may inform the selector module 74, in particular via a virtual interrupt, that the scheduling information shared memory 76 has been updated.

Further, the guest system 22, in particular the operating system kernel 28, for example the selector module 74, is adapted to receive a signal from the virtualization system 26, in particular from the scheduler 66 of the virtualization system 26. For example, the signal may be a virtual interrupt.

In case the selector module 74 receives the signal, the selector module is adapted to determine whether a thread in the guest system should be directly activated. For example, as discussed here-above, the selector module 74 reads the scheduling information shared memory 76 to obtain information whether the first thread 42 should be activated.

If there is no dedicated active application or thread, the dispatcher 68 and/or the selector module 74 is adapted to hand control over to the scheduler 62 of the first guest system 22. The scheduler 62 of the first guest system 22 then uses its regular scheduling algorithm to pick the next thread.

In some embodiments, if the thread 42 in the first guest system 22 starts to run, a message, for example a hypercall, is sent from operating system kernel 28 to the scheduler 66 of the virtualization system 26 for activating at least one respective time reservation for the thread. In other words, thread 42 initialized by the scheduler 62. It is regularly scheduled so that it can complete its initialization. Once that is done, the time reservation in the virtualization layer 26, in particular of the scheduler 66, for the thread is activated. The time reservation in the virtualization layer 26 may or may not be disassociated from the time reservation for the guest system 22. In other embodiments, the initialization and activation can be done by another thread.

The selector module 74 associates an information, in particular an identifier, to be written into the scheduling information shared memory 76 to a particular thread, here thread 42, in case the thread 42 should be directly "scheduled" by the virtualization system 26. The information, as explained above may be an integer value or another identifier. The virtualization layer 26 is only informed about the information or identifier which is associated to the thread and that it should put a time reservation for this information into the "ready" state. In other words, the virtualization layer 26 knows that there is a time reservation associated with a guest system 22 and an information, for example an identification, which associates the time reservation within the guest system 22 to a particular thread 42.

The guest system 25b with the selector module 86, the scheduler 80 and the dispatcher 84 functions accordingly.

According to the invention, the scheduler 66 of the virtualization system 26 schedules the different guest systems 22, 24, 25a, 25b. Further, the virtualization system 26 is adapted to schedule specific threads 42 in specific guest systems 22. The scheduler 66 knows the time reservations associated to thread 42 and guest systems 22, 24, 25a, 25b. The time reservations in the scheduler 66 are associated with an information or identifier and a guest system. The information or identifier, which is stored by the scheduler 66 of the virtualization system 26 in the a scheduling information shared memory 76, 88 enables the respective selector module 74, 86 of the guest system 22, 25b, depending on the information or identifier to determine whether a particular thread should be dispatched or whether the scheduler 68, 84 of the respective guest system 22, 25b should decide, which of the threads should be dispatched. In other embodiments, the information or identifier may be associated to a specific group of threads to be dispatched, including more than two threads.

In the following the functioning will be explained with respect to the guest system 22. However, it works accordingly in the guest system 25b.

Each time reservation in the virtualization layer 26, in particular the scheduler 66, may have several different states, namely inactive, ready, not ready and active on the processor.

If a time reservation is inactive, it may pass to the ready state after a hypercall. For example, as explained above, after the initialization of the thread in the guest system a hypercall may be sent to the virtualization system 26. Further, some time reservations are in the ready state when the guest system or the system is started, for example in case of a fair share scheduling.

Further, a time reservation may pass, by the scheduler 66, from the "ready" state to the "not ready" state. This may happen, for example, when the completion of a thread, in particular a real time thread is indicated through a hypercall. According to another example, a fair share time reservation, which is usually shared by multiple threads of a guest system, is put into the "not ready" state when the systems indicates that it is idle, that is, none of its threads is ready to execute.

The time reservation may pass from the "not ready" state to the "ready" state, when the virtualization system receives the interrupt, for example a timer interrupt or an interrupt from another guest system in the system.

The scheduler 66 of the virtualization system 26 is adapted to toggle a time reservation between the "ready" state and the "active on processor" or "active" state. In other words, if respective time reservation(s) is or are passed by the scheduler to the "active" state, then the respective guest system is dispatched, which then may displatch a thread Only a single time reservation can be active on the processor (also called active state) at any time, in case of a single core processor. In case the system is idle, no time reservation is in the "ready" state. The states of a specific time reservation are known to the scheduler 66.

When a change in the scheduling configuration has happened (a new time reservation has become active), then this information is forwarded to the associated guest system, which then will take further steps (select a thread and dispatch it, either by the scheduler or by the selector module).

For example a time reservation may be ready or active if the corresponding guest system is running.

More than one time reservation may be directly or indirectly associated to a guest system or a real time thread 42. In case a thread 42 that is also scheduled by the virtualization system scheduler 66 is started, the guest system 22, in particular selector module 74, is adapted to associate an identifier or an information with the thread, to notify through a hypercall the virtualization system scheduler 66, that a new time reservation is needed and the associated information or identifier and/or the type of scheduling, so that the virtualization system scheduler can change, in response to reception of the message, the respective time reservation to a ready state. In some embodiments, for security and safety reasons, all time reservations are subject to pre-configuration, for example by a system integrator. The activation can only refer to an (inactive) reservation but cannot change its type or attributes.

The time reservation, in the scheduler 66 includes the type of scheduling, a guest system, the information or the identifier, and a scheduling parameter. For example the time reservation defines whether a real time or a fair share scheduling is applied.

According to an embodiment, a real time scheduling, a cyclic scheduling or a static or dynamic priority scheduling. The scheduling parameter defines the actual values, for example the part of the fair share scheduling, the period in case of cyclic scheduling and the like.

Further, the dispatcher 72 also stores or instructs to store the registers of the guest systems 22, 24, 25a, 25b. For example, the registers include the user registers and the control registers of the operating systems running in the guest systems 22, 24, 25a, 25b. For example, for each guest system 22, 24, 25a, 25b one set of user and control registers are stored. Thus, in case the scheduler stops the execution of a first guest system, it stores or instructs to store the user and control register of the first guest system and loads or instructs to load the user and control registers of the next guest system that should be executed into the processor. In some embodiments, the control registers may be also called PL1 register according to the processor privilege level of the operating system in the guest systems.

For example, the scheduler 66 of the virtualization system 26 may use real time scheduling algorithms (static priority, dynamic priority, cyclic scheduling) of the real time application 32 and their respective threads 42. Further, the scheduler 66 of the virtualization system may provide protection against non-conforming real-time applications, for example by defining a worst-case execution time and enforce that it is not exceeded. The guest system 22 has at least two reservations associated. It uses one time reservation to run thread 42. Another time reservation other one is used to run all other threads or all threads in guest system 22.

According to an embodiment, the scheduler 66 of the virtualization system 26 could associate several time reservations to respective guest system. The dispatcher 72 maintains the state of the user and control registers of a guest system. In other words, several scheduling rules may be associated to one set of user and control registers of a guest system. Thus, for example advanced associations of time reservations may be used, for example N:M, where N are the time reservation(s) provided by the virtualization system scheduler 66 of the virtualization layer and M are the time reservation(s) provided by the scheduler 62, 64 of the respective guest system 22, 24. Thus, several time reservations for several threads are possible.

In an embodiment, which may be combined with other embodiments disclosed herein, the scheduler 66 of the virtualization system 26 may include several scheduler stages. The scheduling rules of the respective scheduling stages are executed one after the other, i.e. in a sequence. In other words, the virtualization system scheduler 66 includes a hierarchical scheduling regime. Thus, for example, at first time, the a first group of time reservations associated to guest systems 22, 24, 25a, 25b and/or indirectly to threads 42, 51c are scheduled according the rules of a first scheduling stage and at a second time, in particular if there is still some execution time left or all time reservations in the first stage are non-ready or inactive, the a second group of time reservations associated to guest systems 22, 24 and/or indirectly to threads 42 are scheduled according the rules of a second scheduling stage. A typical arrangement would encompass two stages: a real-time stage (cyclic or priority scheduling) and a fair share stage. In other embodiments, other arrangements including a larger number of stages, are possible. According to embodiments, the time reservations may be different between the first and second scheduling stages. Time reservations have parameters and run-time data specific to its stage, as already explained above. For example, a fixed priority reservation might have: priority, period, budget per period (parameter), and time so far spent in period (run-time data). In contrast, a fair share reservation may have allotted processor share and time slice length (parameter) and ratio between time allocated and the time it was eligible for (run-time data).

In some embodiments, the scheduler may even comprise more than two stages, for example three or more scheduling stages.

A first scheduler stage may schedule the respective time reservations according to a real time scheduling algorithm and the second scheduler stage may schedule the respective associated time reservations according to a non-real time scheduling algorithm. For example, the first scheduler stage may use a real time scheduling algorithm for low latency, the second stage may include cyclic scheduling and the third stage may include a fair share scheduling algorithm.

Each stage has to take into account the effects of higher classes. One consequence is that a real-time scheduler has to be in the highest or first stage. In special cases (see low latency example) real-time scheduling can reside in the second highest stage but then special coordination with the highest stage is necessary. In contrast, a fair share algorithm is insensitive to higher scheduling stages. Consequently, the combination of one real-time scheduler (highest stage) and a fair-share scheduler is always possible.

In some embodiments, when a guest system or a thread is associated with two or more time reservations, time spent on a first time reservation may be taken into account for a second time reservation for the same guest system or thread for example a thread. This may be also possible for three or more time reservations. The result is a highly predictable faire share scheduler. The advantage over pure cyclic switching is that the unused time can be used as well.

In an embodiment time reservations of different scheduling stages may be coupled. For example, a cyclic scheduling time reservation can be coupled to a fair share time reservation. Time spent by the cyclic scheduling time reservation is also accounted for the fair share time reservation. If there is time left unused in the cyclic scheduler, the fair share time reservation is alloted some part of it. Thus, a guest system is provided with a combination of the traits of different schedulers (in the example: highly predictable execution (cyclic scheduler), work preserving behaviour (fair share scheduler)).

According to an example, two time reservations are assigned to the first guest system 22, a real time cyclic switching time reservation and one fair share time reservation. The time spent in the cyclic switching reservation is also taken into account for the allowed time according to the fair share time reservation. Thus, a share according to the fair share time reservations is obtained with the deterministic behavior of cyclic switching.

In some embodiments, as already described above, the scheduler 66 of the virtualization system 26 is adapted to send a signal, for example virtual interrupt and usage of the scheduling information shared memory 76 including information or an identifier associated to the thread to dispatched or whether the scheduler 62 of the guest system 22 should be activated, to the selector module 74 of the guest system 22. The selector module 74 is adapted to conclude from the information or identifier, whether the guest system as a whole is activated, i.e. the scheduler 62 of the guest system decides, which thread should be activated, or whether a specific thread should be dispatched by the dispatcher 68 of the virtualization system 26. In other words, the selector module 74 stores the association between the information or identifier and the task to be completed, namely direct dispatch of a task or start of the scheduler 62.

In other words, the thread 42 is scheduled by the scheduler 66 of the virtualization system 26, whereas the selection of the time reservation is done by the scheduler 66, and the thread is dispatched by the dispatcher 68 after the selector module 74 has been informed about the information or identifier associated with the respective time reservation. In contrast, the threads 44, 46, 48, 50 are indirectly scheduled, i.e. by the scheduler 62, 64 of the respective guest systems 22, 24, which are in turn scheduled by the scheduler 66 of the virtualization system 26. The thread 42 has therefore (indirectly) a time reservation in the scheduler 66 of the virtualization system 26.

According to the invention the unit of scheduling (time reservation) and unit of execution (for example a guest system or a thread) are decoupled. Thus, a guest system, here the first guest system 22 can run at the same time real time applications 32, which are scheduled by the scheduler 66 of the virtualization system 26, and non-real time applications 34, 36, which are scheduled by the scheduler 62 of the first guest system 32, wherein the first guest system 32 is scheduled by the virtualization system scheduler 66 as a non-real time guest system.

In the following, the different method steps of an exemplary embodiment are detailed.

It is considered that the virtualization system scheduler 66 schedules the first guest system 22, the second guest system 24 and, indirectly, the first thread 42. For that purpose the virtualization system 26 is adapted to store the user and control registers of the first guest system 22 and the user and control registers of the second guest system 24, for example in the memory 5. The user and control registers of the first guest system 22 and the second guest system 24 includes, as they include respectively an operating system all the register states, for example the unprivileged registers, i.e. user registers, and the privileged registers, i.e. the control registers.

The operating system kernel 28 is adapted to store the user registers for executing the threads 42, 44, 46 and their respective applications 32, 34, 36 in the memory 5.

Accordingly, the operating system kernel 30 is adapted to store the user registers for executing the threads 48, 50 in the memory 5.

As described here-above, the virtualization system scheduler 66 assigns one or more time reservations for the first guest system 22 and for the second guest system 24. For example, the virtualization system scheduler 66 assigns a first time reservation and a second time reservation to the first guest system 22. A third time reservation is assigned to the second guest system 24.

Further, according to an example, the first time reservation is associated to the first guest system 22 and an identifier or information that is associated by the selector module 74 to the use of the scheduler 62 of the guest system 22, the second time reservation is associated to the first guest system 22 and an identifier or information that is associated by the selector module 74 to directly dispatch the first thread 42 and the third time reservation is assigned to the second guest system 24 by the virtualization layer scheduler 66. The third time reservation may also include an information or identifier, which is ignored by the interface 27*b*.

According to an embodiment, the virtualization system scheduler 66 assigns the processor time to the first and third time reservation according to a fair share scheduling algorithm. For example, the scheduler assigns 30% of the remaining time not used by real time reservations to the first time reservation and 70% of the time to the third time reservation. Further, the virtualization system scheduler 66 assigns processor time to the second time reservation according to a real time scheduling algorithm, for example a cyclic scheduling algorithm. Thus, the first thread 42 is scheduled as a real time thread.

In an embodiment, the virtualization system scheduler 66 may use a two stage scheduling algorithms as explained here-above, the first stage including the second time reservation and the second stage including the first and third time reservations. The virtualization system scheduler 66 may maintain further real time time reservations.

In step 100, all applications 32, 34, 36, 38, 40 are running and the respective threads 42, 44, 46, 48, 50 are also running. Also the first and second guest systems 22, 24 are running.

Further, in step 100 the second guest system 24 is active. In other words, the user and control registers of the second guest system 24 is loaded in the at least one processor 3 and the respective tasks of that guest system 24 are performed.

In step 110, the virtualization system scheduler 66 determines, for example due to a a reception of a timer interrupt, that a new time reservation should be selected, in particular the second time reservation should be activated, corresponding to the first thread 42. Thus, the second guest system 24 is inactivated. For example, the user and control registers of the second guest system 24 is stored in the memory 5.

Then, in step 120, the virtualization system selects most suitable time reservation, here the second time reservation and identifies the associated to the guest system 22 and the virtualization system scheduler 66 sends optionally a signal, for example, in virtual interrupt, to the first guest system 22. The information or identifier associated to direct dispatch of the first thread 42 is written by the scheduler 66 to the scheduling information shared memory 76.

In step 130, the last state associated with guest system 22, in particular the user and control registers of the first guest system 22, is loaded into the at least one processor 3, for example by the dispatcher 72 of the virtualization system 26. Thus, the last state associated with guest system 22 is restored, when control is given back to it.

According to an embodiment, the virtual interrupt informs the selector module 74 to read the scheduling information shared memory 76.

In step 140, the selector module 74 reads the scheduling information shared memory 76. In other embodiments, the selector module 74 retrieves the information or identifier from the scheduler 66 of the virtualization layer, for example by using a hypercall. According to embodiments, the selector module 74 is part of the guest systems interrupt service handler. For example, the selector module 74 deducts from the information or the identifier that the first thread 42 should be dispatched. Then, in response to reading the information, the selector module 74 informs the dispatcher 68, which determines whether the thread 42 is running.

In case the thread 42 is ready to run, in step 150, dispatcher 68 dispatches the first thread 42 without involving the scheduler 62. For example, the first thread 42 is dispatched by loading the respective user register into the processor 3.

In case, the thread 42 is not ready to run, in step 155, the scheduler hands over the control to the scheduler 62 of the first guest system 22. The scheduler 62 then activates one of the threads 44, 46 and the respective user register is load into the processor 3 by the dispatcher 68.

In step 160, the respective activated thread 42, 44, 46 is inactivated and the respective user register are stored in the memory 5 by the dispatcher 68.

The virtualization system scheduler 66 then stores in step 170 the user and control registers of the first guest system 22 and determines, for example after a hypercall, which time reservations should be activated next. For example, the virtualization system scheduler 66 may determine that the first time reservation corresponding to the first guest system 22 should be activated as a next step in view of the fair share scheduling algorithm.

In case, the virtualization layer 26, in particular the scheduler 66, gets control through an external event not controlled by the guest system (e.g. timer interrupt). step 160 does not take place before step 170.

According to the invention, the system is work preserving. In other words, the system is never idle as long as there are runnable principals in the system. Further, the system is well-suited for a hierarchical scheduling regime, in particular in case of use of a fair share scheduling.

According to an embodiment, the system may apply multiple scheduling regimes, which are used in different circumstances. For example, a first scheduling regime might be used during start up, a second scheduling regime might be used during regular operation, and a third scheduling regime may be used in an emergency mode.

Further, the virtualization system 66 can host at the same time one or more guest systems 22, 25*b* with an selector module and a scheduling information shared memory and one or more guest systems 24, 25*a* without such a selector module and a scheduling information shared memory, as the additional information transported by the scheduling information shared memory 76, 88 is ignored by the guest systems 24, 25*a*.

The invention claimed is:

1. A method for scheduling a plurality of guest systems and/or threads in a system, the system comprising a virtualization system running on a processor, the virtualization system adapted to assign processor time and memory space to the plurality of guest systems and comprising a virtualization system scheduler, the method comprising:
running a first guest system on the virtualization system, the first guest system comprising at least one first thread and at least one second thread running in the first guest system, and a guest system scheduler adapted to assign processing time to the at least one second thread;
assigning, in the virtualization system, a plurality of time reservations to the first guest system, wherein the plurality of time reservations comprises a first time reservation associated to the at least one first thread and a second time reservation associated to the guest system scheduler of the first guest system;

assigning processor time, by the virtualization system scheduler, to the first guest system according to the second time reservation; and further assigning processor time, by the virtualization system scheduler, to the at least one first thread of the first guest system according to the first time reservation, comprising:
providing, by the virtualization system scheduler, information to the first guest system, the information enabling to determine that the at least one first thread has to be dispatched;
dispatching, by the virtualization system, the first guest system; and
further dispatching, by a dispatcher of the first guest system, the at least one first thread in the first guest system.

2. The method according to claim 1, wherein the first guest system comprises a selector module, the method further comprising:
obtaining, by the selector module, the information from the virtualization system scheduler;
determining from the information that the first thread is to be dispatched; and
in response to determining from the information that the first thread is to be dispatched, dispatching the first thread.

3. The method according to claim 1, wherein said assigning processor time, by the virtualization system scheduler, to the first guest system according to the second time reservation comprises:
providing, by the virtualization system scheduler, information to the first guest system, the information enabling to determine that a guest system scheduler has to determine the thread to be dispatched; and
dispatching the first guest system.

4. The method according to claim 3, wherein the first guest system comprises a selector module, the method further comprising:
obtaining, by the selector module, the information from the virtualization system scheduler;
determining from the information that the guest system scheduler has to determine the thread to be dispatched; and
in response to said determining from the information that the guest system scheduler has to determine the thread to be dispatched, assigning processor time, by the guest system scheduler of the first guest system, to the at least one second thread.

5. The method according to claim 1, further comprising:
running a second guest system and/or a third guest system on the virtualization system, the second guest system comprising at least one thread and/or the third guest system comprising at least one thread running in the same processor privilege level as a scheduler and a dispatcher of the third guest system;
assigning a fourth time reservation to the second guest system and/or a fifth time reservation to the third guest system; and
dispatching, depending on the fourth time reservation, the second guest system and/or dispatching, depending on the fourth time reservation, the third guest system.

6. The method according to claim 1, wherein the information is an identifier, in particular an integer stored by the virtualization layer scheduler in a scheduling information shared memory.

7. The method according to claim 1, wherein the at least one first thread is a real-time thread.

8. The method according to claim 1, wherein the at least one second thread is a non-real time thread.

9. The method according to claim 1, wherein a guest system, the information, a type of scheduling and/or a scheduling parameter is assigned to each time reservation, wherein in particular the type of scheduling is a real time scheduling or a fair share scheduling.

10. Non-volatile memory including a program containing commands for executing a method for scheduling a plurality of guest systems and/or threads in a system, when loaded and executed on a processor, the system comprising a virtualization system adapted to assign processor time and memory space to the plurality of guest systems and comprising a virtualization system scheduler, the method comprising:
running a first guest system virtualization system, the first guest system comprising at least one first thread and at least one second thread running in the first guest system, and a guest system scheduler adapted to assign processing time to the at least one second thread;
assigning, in the virtualization system, a plurality of time reservations to the first guest system, wherein the plurality of time reservations comprises a first time reservation associated to the at least one first thread and a second time reservation associated to the guest system scheduler of the first guest system;
assigning processor time, by the virtualization system scheduler, to the first guest system according to the second time reservation; and
assigning processor time, by the virtualization system scheduler, to the at least one first thread of the first guest system according to the first time reservation, comprising
providing, by the virtualization system scheduler, information to the first guest system, the information enabling to determine that the at least one first thread has to be dispatched;
dispatching, by the virtualization system, the first guest system; and
further dispatching, by a dispatcher of the first guest system, the at least one first thread in the first guest system.

11. A system comprising:
at least one processor connected to at least one memory;
a virtualization system adapted to run on said at least one processor, the virtualization system being adapted to assign processor time and memory space to a plurality of guest systems, and comprising a virtualization system scheduler;
a first guest system adapted to run on said virtualization system, the first guest system comprising:
at least one first thread adapted to run in the first guest system;
at least one second thread adapted to run in the first guest system;
a guest system scheduler adapted to assign processing time to said at least one second thread; and
a dispatcher adapted to dispatch said at least one first thread,
wherein, in said virtualization system, a plurality of time reservations is assigned to said first guest system, the plurality of time reservations comprising a first time reservation for said at least one first thread and a second time reservation associated to said guest system scheduler of said first guest system, wherein said virtualization system scheduler is adapted to assign processor time to said first guest system according to the second time reservation, and wherein said virtualization system scheduler is further adapted to assign processor time to said at least one first thread of said first guest system according to the first time reservation by providing information to said first guest system, the information enabling to determine that said at least one first thread has to be dispatched, dispatching, by said virtualization system, said first guest system, and further dispatching, by said dispatcher of said first guest system, said at least one first thread in the first guest system.

12. The system according to claim 11, wherein assigning processor time, by said virtualization system scheduler, to said first guest system according to the second time reservation comprises dispatching said first guest system.

13. The system according to claim 12, wherein said first guest system comprises a guest system scheduler adapted to assign processor time to said at least one second thread.

* * * * *